United States Patent [19]
Borg et al.

[11] 3,780,767
[45] Dec. 25, 1973

[54] CONTROL VALVE TRIM HAVING HIGH RESISTANCE VORTEX CHAMBER PASSAGES

[75] Inventors: Karl Stanley Borg, Westboro; Henry W. Boger, Westwood, both of Mass.

[73] Assignee: Masoneilan International, Inc., Norwood, Mass.

[22] Filed: Dec. 18, 1972

[21] Appl. No.: 316,038

[52] U.S. Cl. ............... 137/625.3, 251/127, 138/42, 137/625.37
[51] Int. Cl. ......................................... F16k 47/04
[58] Field of Search ................... 137/625.28, 625.3, 137/625.33, 625.37; 251/118, 27, 205, 210, 211; 138/37, 40, 42

[56] References Cited
UNITED STATES PATENTS

| | | | |
|---|---|---|---|
| 1,517,598 | 12/1924 | Stevenson | 138/42 UX |
| 2,642,895 | 6/1953 | Bertin et al. | 138/37 |
| 2,893,432 | 7/1959 | Gibson | 138/42 X |
| 3,513,864 | 5/1970 | Self | 251/205 X |

Primary Examiner—Henry T. Klinksiek
Attorney—C. Yardley Chittick et al.

[57] ABSTRACT

A control valve trim cage having high resistance, fluid flow energy absorbing, vortex chamber passages opening between the cage bore and circumference.

A control valve having a trim cage comprising a stack of like plates together formed with radially and axially distributed, vortex chamber passages extending between the stack walls. The control valve further having a valve plug axially shiftable within said stack to variously cover and uncover said plates and passages and thereby to adjust or regulate fluid flow through said valve.

An improved construction for the high resistance fluid passages of a stacked plate design of control valve trim wherein the passages are provided within or through one or more trim plates and are characterized each by a generally radially disposed, tangential inlet; a single, spiral flow vortex chamber; and a generally radially disposed, non-reversing outlet.

30 Claims, 17 Drawing Figures

3,780,767

CONTROL VALVE TRIM HAVING HIGH RESISTANCE VORTEX CHAMBER PASSAGES

BACKGROUND OF THE INVENTION

This invention provides an improved, single stage, vortex chamber passage trim for a variable fluid restrictor control valve. In use, the invention affords a low noise trim for compressible fluid service and an anti-cavitation trim for liquid service.

This invention improves upon the prior variable fluid restrictors, or high energy loss fluid control means, both of the frictional drag passageway and of the labyrinth, or multiple abrupt or angular turn passageway types. Such prior, variable fluid restrictor or high energy loss control means or devices are exemplified by Self U.S. Pats. Nos. 3,451,404 and 3,514,074 having frictional drag passageways, and by Self U.S. Pat. No. 3,513,864 and Cummins U.S. Pat. No. 3,529,628 having multiple abrupt, angular turn passageways.

With the mentioned prior high pressure fluid control means, sometimes called drag valves, the dissipation of the energy of the flowing fluid is by frictional drag through smooth, round passages, or by successive, abrupt restrictions and expansions through tortuous or labyrinth passages.

The vortex chamber passaged plates of this invention employ a different physical principle of energy dissipation, wherein that dissipation is due to the spiral vortex flow within each vortex chamber. In the vortex chamber fluid passages hereof, a radial flow is superimposed upon the concentric flow of a free vortex, whereby the fluid flow lines are spirals. The radial velocity increases with decreasing radius, and the pressure distribution, which is the same as in the case of spiral flow, creates a high back pressure at the inlet of the vortex chamber, which gives the dynamic effect of high fluid resistance.

The trim plates, and more particularly the vortex chamber passages, of this invention, are simply and easily and also economically to be fabricated by any of several known, automated methods.

The tortuous, multiple angular turn flow paths of the mentioned prior art drag valves, on the other hand, will be understood to require a very complex flow passage with precise dimensional requirements.

One improvement wrought by the vortex valve trim of this invention is that a high resistance flow passage is attained with a simplicity of design and manufacture.

Another important improvement realized under the invention is that a high resistance passage is attained with flow passages of relatively large cross sectional area, as compared with the orifice-restricted passages of the prior art constructions. This improvement substantially eliminates the prior art, labyrinth type valve problem of deposit and trapping of solids entrained in the fluid stream.

Yet another improvement realized under this invention is that the fluid passages hereof may be substantially shorter than the multiple angular turn passages of the prior art drag valves. It has been found, for example, that the single stage, vortex chamber passage of the invention which is herein shown and described produces a drag or head loss equivalent to that for which is required some five to seven angular turns, with the labyrinth type passage of the prior art.

BRIEF SUMMARY OF THE INVENTION

The invention comprises a stacked plate type or design of control valve trim novelly characterized or distinguished by high resistance, vortex chamber fluid passages.

The vortex chamber fluid passage of the invention comprises a radial entrance passage inletting from one annular wall, either the bore of the circumference, of the plate stack; a generally circular vortex chamber into which the entrance passage opens tangentially; an axial exit hole opening from the approximate center of one, either the top or bottom, side of the vortex chamber; and a radial exit passage outletting from the axial exit hole to the other annular wall of the plate stack.

The invention further comprises a control valve, improved by a stacked plate type, vortex chamber passaged trim, and more particularly by novel vortex passage forming plates for said trim.

The invention trim is employable with liquids, for which it functions as an anti-cavitation trim, and also with gas or steam, for which it qualifies as a low noise trim.

DESCRIPTION OF THE PREFERRED EMBODIMENTS

Figure 1:
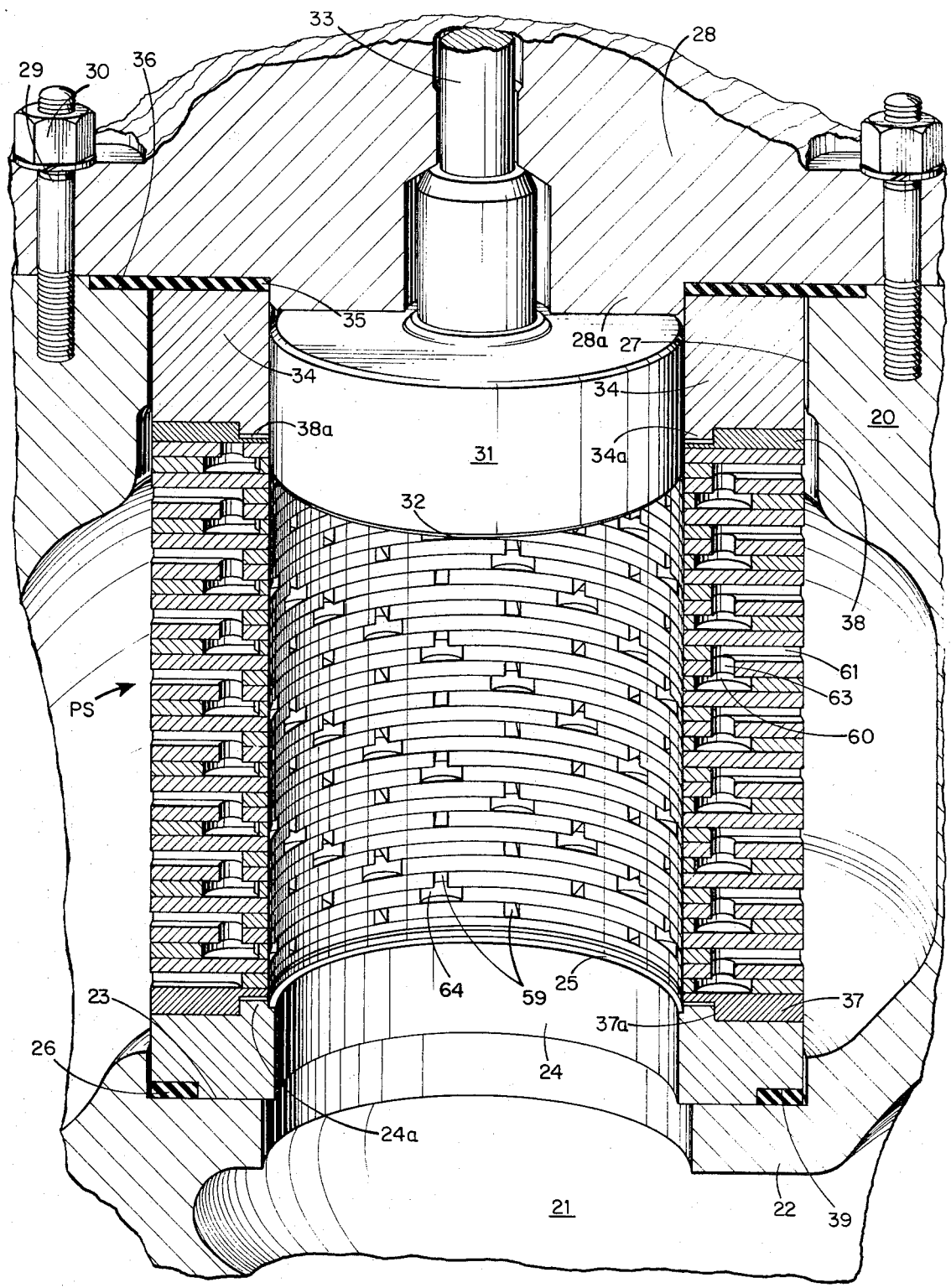
FIG. 1 is a vertical section of a control valve incorporating a two-plate type embodiment of the invention vortex chamber trim.

An exemplary control valve with which the invention trim may be employed is shown in FIG. 1 to comprise a tubular housing 20 having formed therethrough a fluid passage 21 terminating in inlet and outlet openings. The housing will be understood to be fitted, at said openings in anywise, as conventionally by flanges, for coupling or bolting in a fluid flow line.

Fluid passage 21 is interiorly divided by a partition or bridge wall 22 having a trim seating ledge 23 milled therein, and on which is received the usual seat ring 24 having an inwardly projecting extent or portion ground or bevelled at its upper face to define a valve plug engaging chamfer or seat 25.

Means are provided for sealing between the bridge wall 22 and seat ring 24, as herein by a gasket 26 partially recessed into ring 24 and compressed between that and bridge ledge 23.

Valve housing 20 is provided opposite bridge wall 22 with access opening 27 through which the invention trim, or plate stack PS, is received, and within which the stack is held and sealed by the usual bonnet 28.

Means are provided for releasably securing bonnet 28 to valve housing 20 for clamping up the plate stack, such means herein shown as the conventional studs 29 received through the bonnet 28 and threaded into the housing 20, and having threaded thereon the usual hex nuts 30.

Receiving and sealed in anywise through the bonnet 28 is a valve plug 31 proportioned for a snug sliding fit within the plate stack, and having a bottom chamfer 32 mating with valve seat 25. Plug 31 is controlled, for axial shifting between a valve closed position of engagement against seat 25, and the valve full open position of FIG. 1, by a stem 33 controlled in turn by any suitable actuator, the latter extenal to the invention and therefore not shown.

The plate stack may comprise or be surmounted by an adaptor ring 34 balancing the seat ring 24, and taking up all or most of the height or space occupied by the valve plug 31.

Means are provided for sealing between the top of the plate stack, herein the adaptor ring 34, the valve housing 20, and the bonnet 28, said means being herein illustrated as a resilient gasket 35 fitting between the ring 34 and bonnet 28, and partially received in a ring-surrounding recess 36 provided therefor in the valve housing 20.

The plate stack may further comprise a pair of bottom and top blank or dead plates 37, 38 fitting the plate stack to seat and adaptor rings 24, 34 by mating male-female formations, or axial projections and recesses, formed as shown on one and the other pairs of said parts, and herein illustrated as ring 24 flange 24a fitting plate 37 recess 37a, and ring 34 projection 34a fitting plate 38 recess 38a.

The plates making up the stack between the rings 24, 34 may be clamped and brazed together, before their final machining for smooth passage therewithin of plug 31.

The plate stack PS, comprising a plate multiplicity to fill the fluid passage 21 between the bridge wall 22 and the bonnet 28, or more particularly between the seat ring 24 and adaptor ring 34, is rigidly held in place by the assembly therewith of the bonnet 28, which may have a central annular flange 28 snug-fitting, and thereby centering, the ring 34. The clamping up of the bonnet 28, as by the turning down of hex nuts 30 on threaded studs 29, places and holds gaskets 26, 35, and thereby the intervening plate stack PS, under compression, by the said gaskets 26, 35 initially being oversized, as above indicated, relative to their respective recesses 39, 36 in the seat ring 24 and valve housing 20.

In all embodiments hereof, the invention plate stack comprises a plurality of multiplicity of radially and axially distributed, single stage, vortex chamber fluid passages extending between, and which may be arranged for flow in either direction between, the longitudinal or axial walls, or bore and circumference, of the plate stack.

Figure 2:
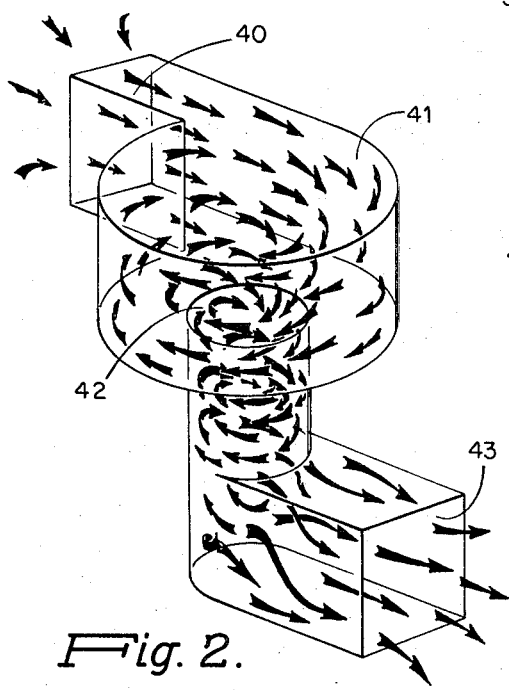
FIG. 2 is a larger scale view of the characteristic high resistance, vortex chamber fluid passage of the invention, with arrows illustrating the novel, spiral-spin fluid flow therethrough.

As best shown in FIG. 2, the vortex chamber fluid passage hereof comprises an entrance passage, or fluid passage inlet or entrance portion 40 opening or inletting radially from the bore or circumference of the plate stack. A generally circular vortex chamber 41 is disposed intermediate in and radially of the plate stack, and has an entrance portion by the inlet passage 40 leading tangentially thereinto.

One side wall of entrance passage 40 is thus continuous with, or merges into, vortex chamber 41, and the lateral dimension of the passage 40 is less than half the diameter of the chamber 41.

A round or generally circular vortex chamber exit hole 42 is vertically or axially disposed, and leads or outlets from the top or bottom flat or radial side of vortex chamber 41. Exit hole 42 is located at the center of, or approximately so, and so as to be coaxial with, or approximately so, vortex chamber 41.

An exit passage, or fluid passage outlet or exit portion 43, intersects chamber exit hole 42, and opens or outlets radially therefrom to the circumference or bore of the plate stack, according as the fluid flow is to be outwardly or inwardly therethrough.

The lateral cross section of the inlet passage 40 may be, more particularly, half the difference between the radius of the exit or outlet hole 42 and the radius of the vortex chamber 41, and such that the inside of the inlet passage 41 occupies a line tangential to the near side of the exit hole 42.

The radius of exit hole 42 may be half, or approximately that, of the radius of the vortex chamber 41.

The intersecting of the fluid passage exit 43 with the chamber outlet hole 42 is with the exit 43 having tangency to, or having the same width or lateral section as the radius of, the hole 42, and having a circular or half round inner terminus defined by the rear or inside wall of the hole 42.

Figure 14:
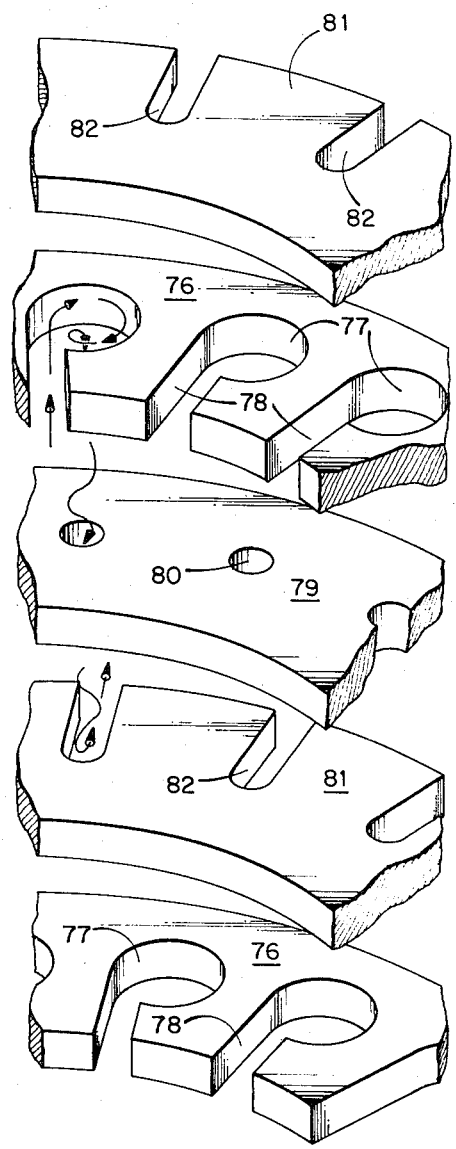
FIG. 14 is an exploded perspective of a stack of the FIGS. 11–13 plates completing a fluid passage in that three-plate type embodiment of the invention trim.
Figure 15:
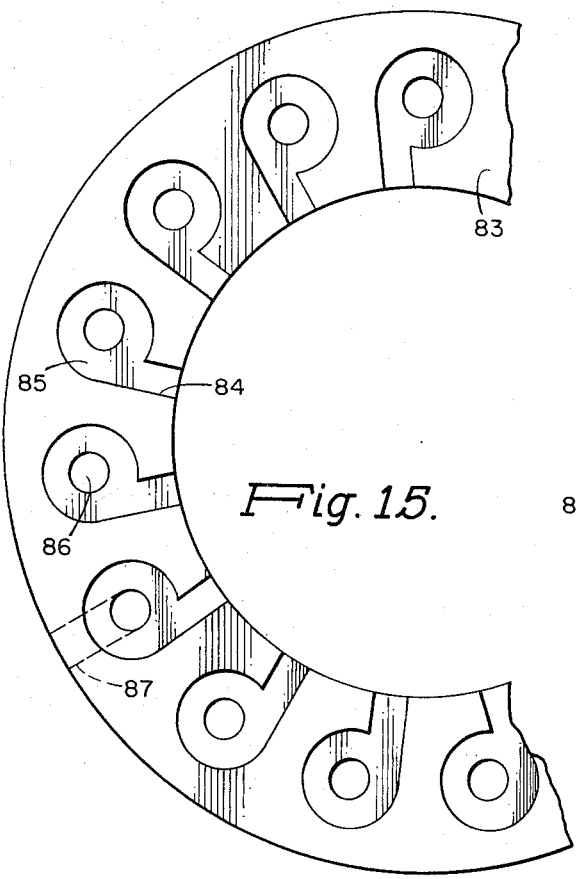
FIGS. 15 and 16 are top and bottom plan views of a cast plate embodiment of the invention trim.
Figure 16:
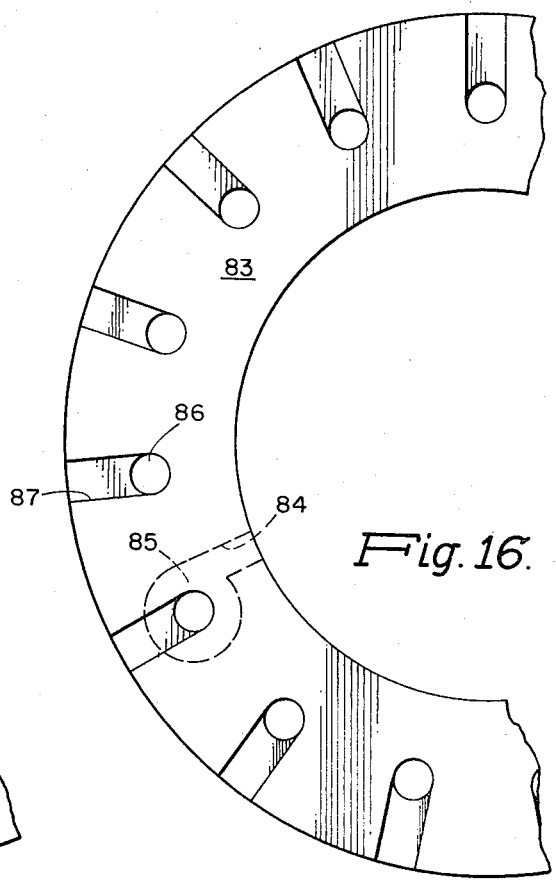
Figure 17:
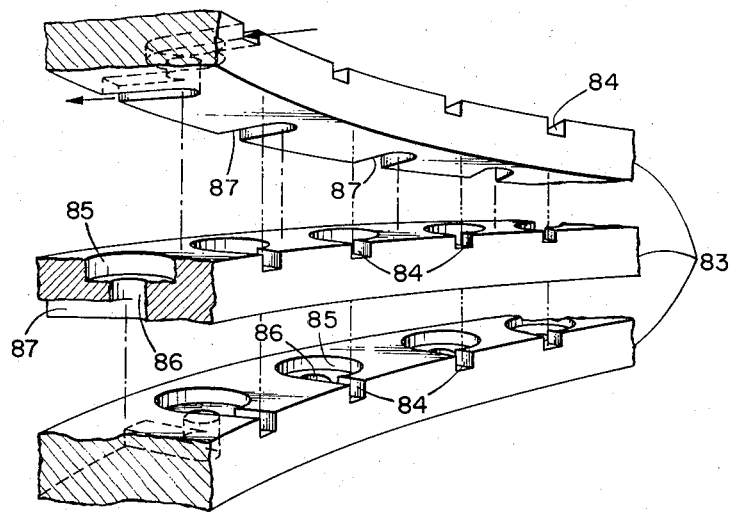
FIG. 17 is an exploded perspective of the stack required to complete a fluid flow passage, in the trim employing the cast plate of FIGS. 15 and 16.

Whether the plates comprise stampings, as in the FIGS. 1 and 3–14 embodiments, or precision castings, as in the FIGS. 15–17 embodiment, the sidewalls of the vortex chamber fluid passage 40–43 are conveniently and suitably made straight vertical, as shown; and their top and bottom walls, whether formed within a plate, or defined by overlying or underlying, unapertured portions of adjacent plates, may similarly be straight horizontal, as shown. As a result, the inlet and outlet or entrance and exit portions 40, 43 of the vortex chamber fluid passage will usually have a square or other rectangular cross section, and the cylindrical or generally cylindrical-sided vortex chamber 41 and chamber exit hole 42 will correspondingly have flat top and bottom surfaces, continuous with or formed by the horizontal surfaces completing top and bottom the fluid passage inlet 40 and outlet 43, all as will readily be understood from FIG. 2.

The vortex chamber fluid passage hereof is a high resistance fluid passage, comprised in the stacked plate trim of the invention, and providing thereby low noise energy absorbtion in compressible fluid service, and anti-cavitation energy absorbtion in liquid service.

The different physical principle of operation of the novel vortex chamber, control valve fluid passage of the invention is represented by the arrows in FIG. 2.

In the vortex chamber fluid passage hereof, the fluid flow is admitted radially of the stack, or generally so, to the passage inlet 40, and injected therefrom tangentially into the vortex chamber 41. The fluid flow may undergo many revolutions in chamber 41, in which, accordingly, the surfaces, and more particularly the cylindrical walls, of the chamber 41 are re-used as many times, in the build-up or accumulating of the resulting fluid resistance therein.

The fluid flow in the high resistance, single stage, vortex chamber fluid passage hereof is further characterized in that the energy dissipation is due to a spiral flow within the vortex chamber, again as shown by the arrows, FIG. 2. In this, as the fluid moves towards the center of the chamber 41, conservation of angular momentum requires that its tangential velocity increase. Thus, since pressure head is dependent upon velocity head, a pressure distribution exits.

More particularly, the flow field of the vortex creates a pressure drop across the chamber 41 between the inlet 40 and outlet 43, and, in effect, creates a high back pressure at the inlet of the vortex chamber. In other words, by the principle of conservation of angular momentum, rather than by the principle of velocity reducing changes of direction, the resistance to flow through the vortex chamber is in effect increased; i.e., there is created the dynamic effect of high fluid resistance.

Figure 3:
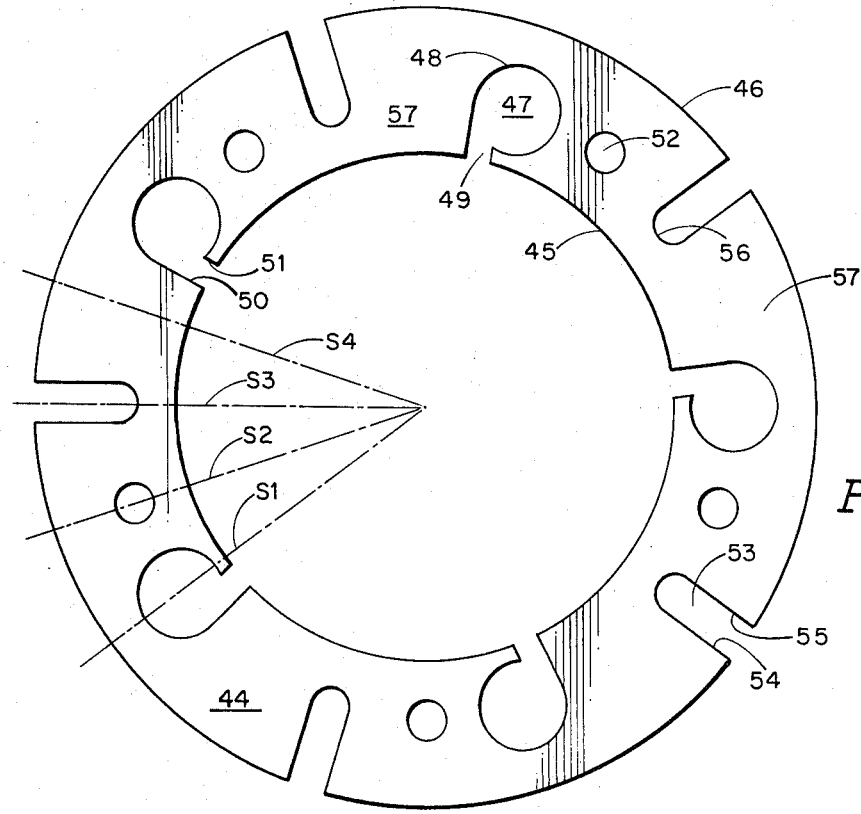
FIG. 3 is a plan view of a plate for a one-plate type embodiment of the invention trim.
Figure 5:
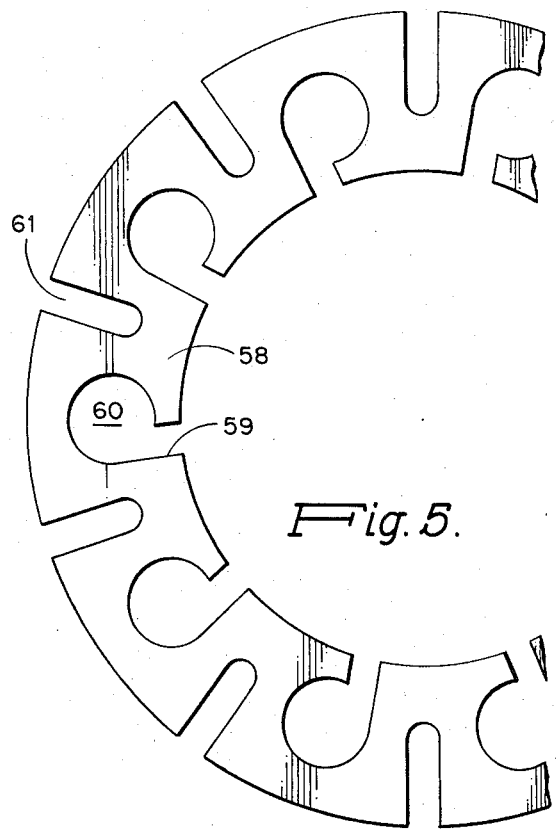
FIGS. 5 and 6 are plan views of the first and second plates for a first, two-plate type embodiment of the invention trim.
Figure 6:
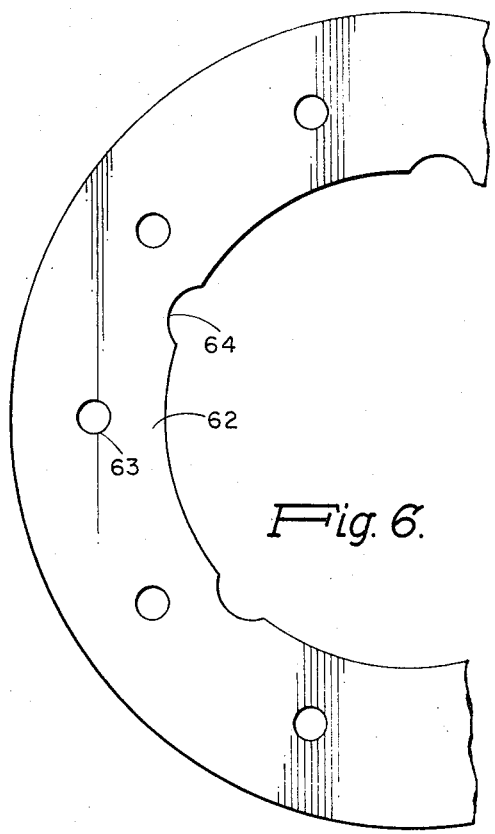

A single plate type, form, or embodiment of the invention vortex chamber trim is shown in FIGS. 3 an 4 to comprise a plate 44 fitted or formed for providing a wanted number of one or more vortex chamber fluid passages radially or circumferentially of the plate stack, and to that end divided into one or more sets of four, equal, angular or radial segments or sectors bisected each by the lines S1, S2, S3, and S4.

The plate 44 is stamped, punched, or otherwise formed in its first sector or sectors S1, and intermediate its bore and circumference, or annular or generally annular inner and outer walls 45, 46, with round or cylindrical cuts or openings defining the cylindrical side walls 48 of the vortex chambers 47 to be formed thereat in the assembled plate stack.

Figure 4:
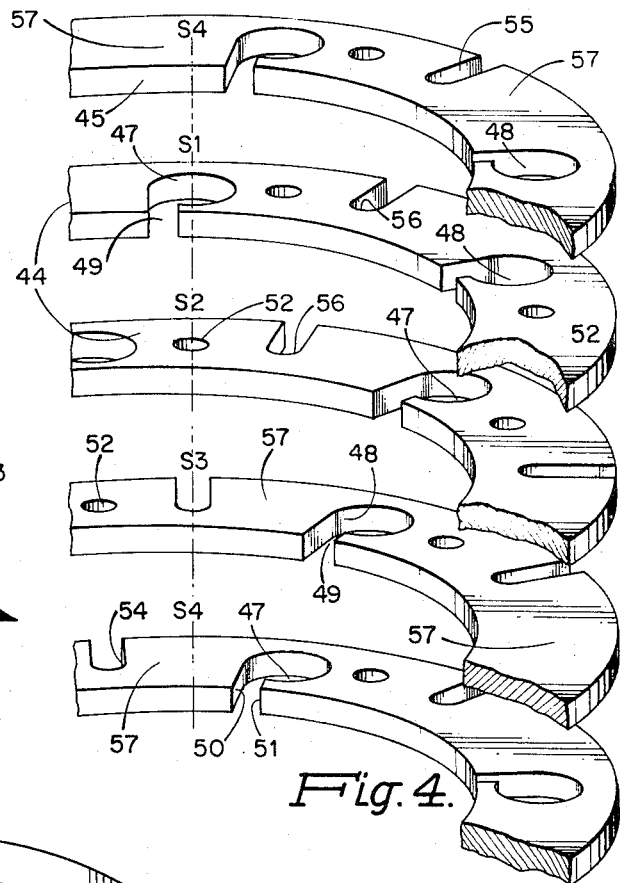
FIG. 4 is an exploded view of a set of the FIG. 3 plates that completes a fluid passage in the one-plate type embodiment.

Plate 44 is additionally and similarly cut or apertured in each first sector S1 by a kerf or slot 49 defining a vortex passage inlet, or entrance passage to the vortex chamber 47, and inletting or opening thereinto, in the FIGS. 3 and 4 example of the single plate embodiment, from within the plate bore or inner wall 45.

While the vortex chamber fluid passages are herein conveniently shown as for resisting fluid flow outwardly from the bore to the circumference of the plate stack, it is here again pointed out that the arrangement may as conveniently be reversed, so as to have the vortex chamber entrances 49 inletting, in the FIGS. 3 and 4 and any embodiment, from the stack circumference or outer wall, or more particularly the plate circumference or outer wall 46.

The one or more inlet or entrance passage slots 49 are also conveniently defined by vertical-straight, parallel-radial side walls 50, 51. One slot side comprises a side wall 50 tangential to one side of the vortex chamber, or chamber opening 47, and thus a straight radial line extension of the chamber side wall 48. The spacing of the opposite slot side wall 51 therfrom may as shown be less than half the diameter of the vortex chamber opening 47, whereby the chamber wall 48 is oriented or turning outwardly, at its intersection with the said opposite inlet side wall 51.

In its one or more second sectors 32 the plate 44 is stamped or cut with round or cylindrical holes 52 to define or form, in the assembled plate stack, the axial outlets or exit holes for the vortex chambers 47. As above described in reference to FIG. 2, the exit holes 52 are radially reducing from or smaller than, and in the assembled plate stack, coaxial with, or approximately so, the vortex chambers 47, this in the FIGS. 3-4 and every embodiment.

In its one or more third sectors S-3, the stamped plate 44 is formed or cut, at its other, herein outer, wall 46 with or by a kerf or slot defining or forming a vortex passage exit, or outletting passage 53, the same defined more particularly by vertical-straight, parallel-radial side walls 54, 55, conveniently of a spacing defining a slot width equal to the diameter of the exit hole 52, again as above described in reference to FIG. 2. The outlet passage or exit slot 53 herein also has an inward terminus defined by a cylindrical or half round wall 56 into which the exit slot side walls 54, 55 tangentially merge. The exit slot or passage 53 extends radially from its plate perimeter, herein inwardly from the plate outer wall 46, such that the center of its round inner terminus 56 is coaxial with the center of the exit hole 52, and so that, accordingly, the said terminus 56 will be continuous with the back or far side, herein inner side, of the hole 52, in the assembled plate stack.

FIG. 4 shows the relative rotation of the plates in the set of five that are needed to complete one or more single stage, vortex chamber fluid passages in the FIGS. 3 and 4 embodiment of the invention, which embodiment is seen also to require only the multiplying of a single plate, and more particularly the repeating of the five-plate sets, to provide a wanted multiplicity of the vortex chamber passages axially or longitudinally as well as laterally or radially of the invention trim. In this the center three plates in any five-plate set are relatively rotated, or angularly adjusted, to bring into congruence their sector lines S1, S2 and S3, whereby the centers of their vortex chambers 47, exit holes 52, and exit passages 53, being on a common radius, or same circle intermediate the stack perimeters, also are in line vertically or longitudinally of the plate stack. There is thus produced for the FIG. 4 plate stack the similar vortex chamber passage configuration as shown in, and heretofore described with reference to, FIG. 2, and in which there is to occur also the similar radial-axial-radial flow pattern, within the said central three plates of the five-plate stack set of FIG. 4.

The plates 44 are comprised in their fourth sectors S4 of solid or unapertured wall portions 57. In the FIG. 4, five plate stack assembly, the top and bottom plates are rotated or angularly adjusted to bring their fourth sector lines S4 into congruence with the first, second and third sector lines S1, S2, and S3 of the second, third and fourth plates in the five-plate stack, as shown. Thus, in the said stack the unapertured or solid wall portion 57 of the top plate closes over or completes the top of the inlet 49 and vortex chamber opening 47 of the second plate in the stack.

That portion of the top wall or face of the third plate of the stack which surrounds the third plate's second sector exit hole 52 defines the bottom side or radial wall of the said vortex chamber opening 47. And the second sector hole 52 surrounding portion of the bottom wall or face of the third plate in the stack closes over, and thereby defines the lateral or radial top wall of, the exit passage 53 formed in the fourth plate of the FIG. 4 stack.

The bottom or the fifth plate in the stack provides, by its fourth or S4 sector, solid wall portion 57, the lateral or radial under or bottom side wall of the exit passage 53. The said bottom or fifth plate thereby completes the vortex chamber fluid passage illustrated in FIG. 4 as exemploary of the one or more such passages which may be provided in any one five-plate set, in the FIGS. 3–4 embodiment.

It is here again pointed out that centers of the vortex chambers 45, exit holes 52, and exit passage inner terminae 56 are all located on a same or common radius, or intermediate circle, of the plate 44, to complete a vortex chamber fluid passage hereof. And that the relative rotation of the successive plates in the five-plate stack which brings their respective sectors S4, S1, S2, S3, and S4 into the indicated vertical congruence is also such as to successively space, or angularly rotate, their corresponding passage portions, from plate to plate, by the angular distance of one sector.

In the one-plate embodiment of FIGS. 3 and 4, then, the corresponding passage-portions in the successive plates of the stack will spiral sector-by-sector about the stack axis, as also clearly shown in FIG. 4. In this one-plate embodiment of the invention trim also, every plate in the stack is seen as provided with one or more fluid passage inlets, and such that each shift of the valve plug 31 by the thickness of one plate 44 serves to cover or uncover the set of fluid passages originating or having their inlet passages 49 in that particular plate 44.

Further to the FIGS. 3 and 4 embodiment, and similarly in the other embodiments, the vortex chamber passages spiral about the stack axis, herein sector-by-sector, from one plate, or plate set, to the next. Thus in the FIGS. 3 and 4 embodiment, and considering downwardly the stack as arranged in FIG. 4, at least one new five-plate, vortex passage completing set is defined at one sector to the left, with each advance from one plate to the next.

So, again in the FIGS. 3–4 embodiment, the corresponding passage portions shift by one sector from one plate to the next, and hence the successive passage forming sets, which are overlapping through the set, are also one-sector-staggered from one plate to the next.

A design or embodiment of the invention trim requiring alternate provision in the stack of two differently constructed plates is shown in FIGS. 1 and 5–7 to comprise a first plate 58 stamped or cut as before to provide the vortex passage inlets 59 and chambers 60, and alternating therewith the outlets 51. Further to this embodiment, a second plate 62 has the exit holes 63 radially and angularly distributed to be coaxial with, or more particularly to be vertically aligned with and on the same radial spacing as, the first plate chamber openings 60 and outlets 62, in the stacking thereof, all as clearly to be understood from FIGS. 1 and 7 when considered in connection with the discussion hereinbefore of the like congruence of the FIG. 4 plate stack.

Figure 7:
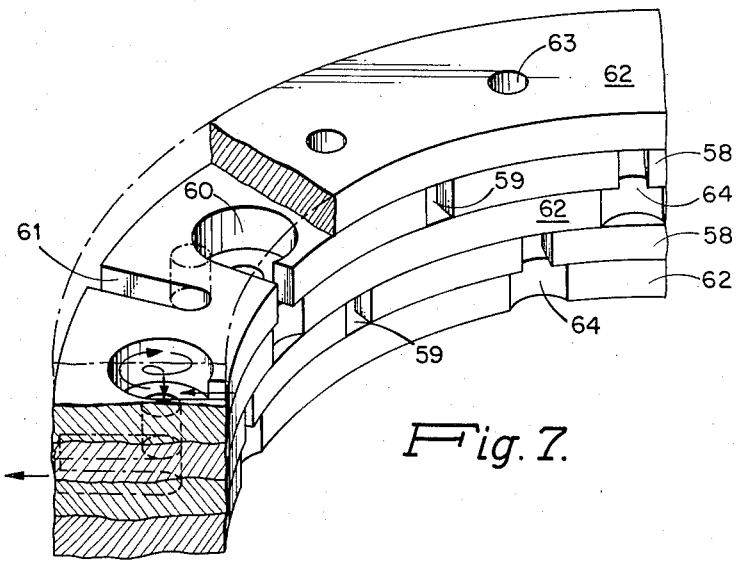
FIG. 7 is a cutaway perspective of a stack of the FIGS. 5 and 6 plates completing a fluid passage in that first, two-plate type embodiment of the invention trim.

FIG. 7 shows a vortex chamber passage to be completed in this embodiment also be a set of five plates, of which the top-most, center, and bottom-most, or first, third and fifth, are second plates 62, and the second and fourth are first plates 58. The top-most and bottom-most, or first and fifth plates 62, are seen to close over the inlets 59 and chambers 60, and under the outlets 61, respectively, by the vertical juxtaposition thereover and thereunder of the solid or unapertured wall portions intermediate the plate 62 openings 63. And the second, third and fourth plates in the stack are seen to be relatively rotated, or angularly adjusted, to bring their chambers 60, exit holes 63, and outlets 61 into vertical alignment, or vortex chamber passage forming communication, again as clearly shown in FIGS. 1 and 7.

A further feature of this FIGS. 1 and 5–7 embodiment is the optional provision at the inner perimeter of its second plates 62 of the half-round or similar scallops or cutouts 64, which are located on said plates 62 so as to line up the said cutouts 64 with the first plate 58 inlets 59, when the second plate 62 exit holes 63 are lined up or vertically aligned as above described with the first plate chambers 60 and exit passages 61. The cutouts 64 may be provided in a number to eliminate partially or altogether the step response, or dead band effect, that would otherwise be experienced as the valve plug passed every second plate 62 having no vortex chamber passage inlets formed therein. With the provision of the cutouts 64, in other words, the response to the throttling, or flow increasing or decreasing, movement or adjustment of the valve plug is smoothed out, and the axial fluid passages provided by the cutouts 64 around the periphery of the valve plug 31 open or give access to the passage inlets 59 in a succeeding first plate 58 immediately the plug passes a preceeding first plate 58, and all or less than all according as the second plate cutouts 64 are provided for, or over or under, every or less than every of the first plate inlets 59.

Figure 8:
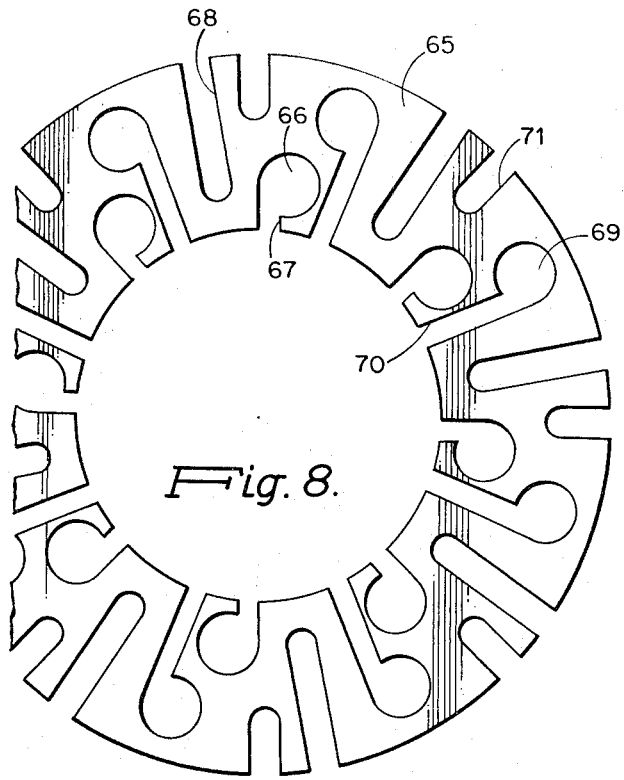
FIGS. 8 and 9 are plan views of the first and second plates of a second, two-plate type embodiment of the invention trim.
Figure 9:
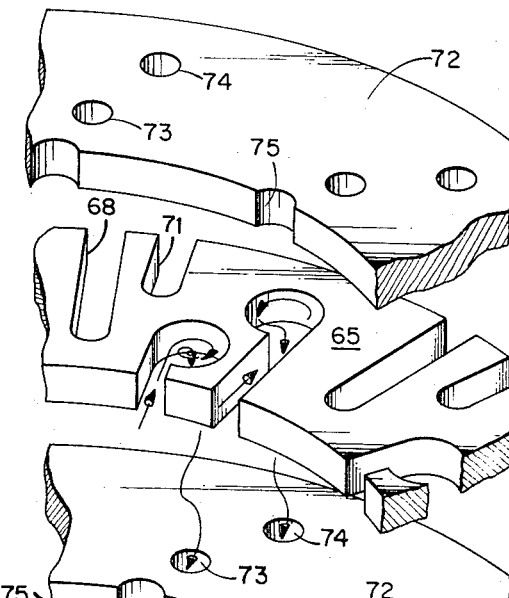
Figure 9:
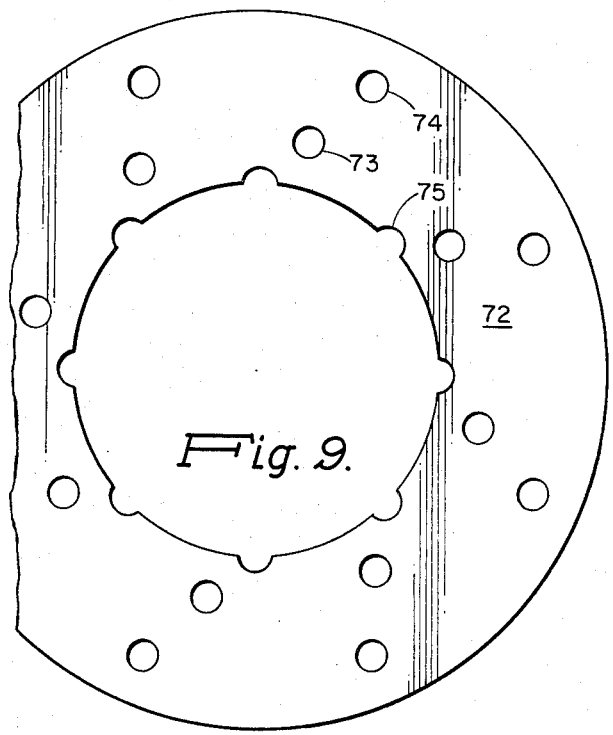
Figure 10:
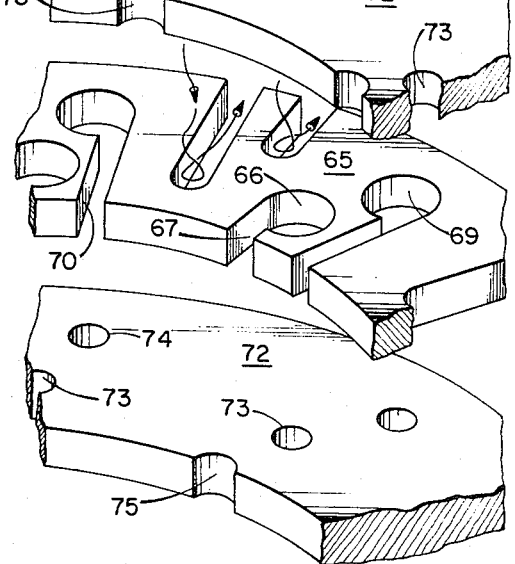
FIG. 10 is an exploded perspective of a stack of the FIGS. 8 and 9 plates completing a fluid passage in that second, two-plate type embodiment of the invention trim.
Figure 11:
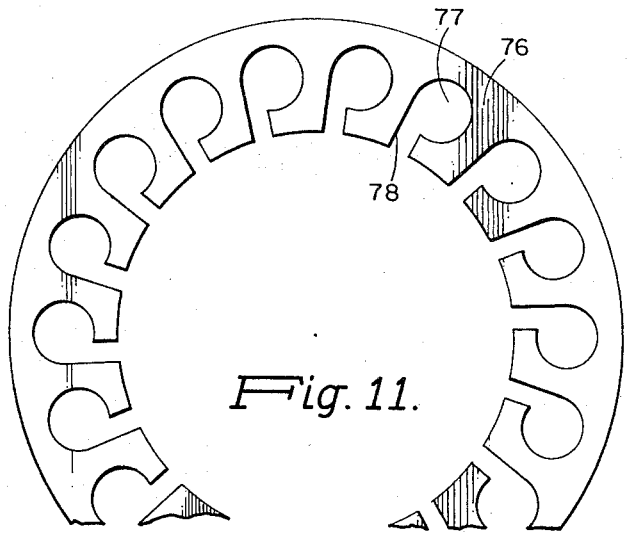
FIGS. 11–13 are plan views of first, second and third plates of a three-plate type embodiment of the invention trim.
Figure 12:
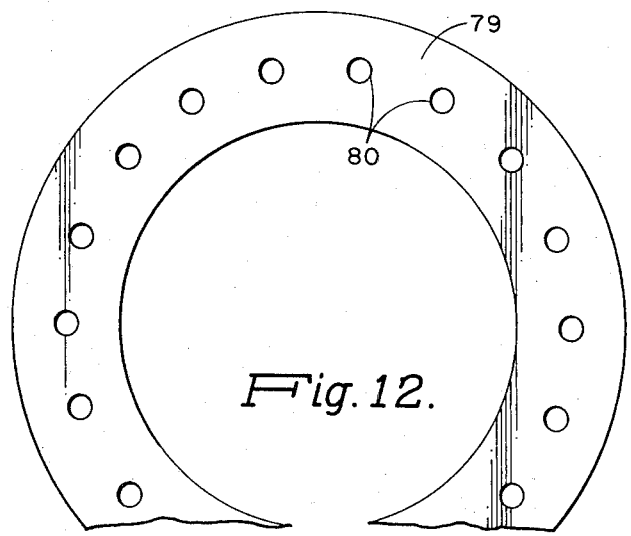
Figure 13:
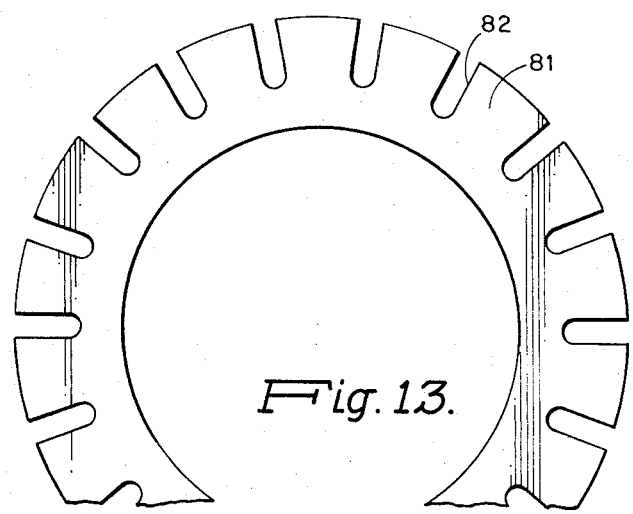

A modified form of the two-plate design or embodiment of the invention trim is shown in FIGS. 8–10 to comprise a first plate 65 having a double or inner and outer pattern of vortex chamber passage openings therethrough. In this the inner chamber vortex openings 66 having the shorter inlets 67 are in the stack to be lined up with, or are in successive first plates 65 arranged to be vertically aligned with, the longer outlet passages 68, whose inward terminae are coaxial with, or are centered on the same plate 65 radius, or intermediate circle, as are centered the said chambers 61.

Similarly, the outer vortex chamber openings 69 having the longer inlet passages 70 are for lining up, in successive first plates 65 of the stack, with the shorter outlet passages 71, whose inward extent, again, is to center their inward terminae on the same plate 65 radius or intermediate circle as are centered the outer chambers 69.

The FIGS. 8–10 embodiment further comprises a second plate 72 having cut therethrough the inner and outer exit holes 73, 74 whose radial spacing and angular distribution on said second plate 72 corresponds to that of the inner and outer chamber openings 66, 69 on the first plate 65.

As a result, in the lining up of a five-plate stack of alternating first and second plates 65, 72 as shown in FIG. 10 to complete, or provide and also close over and under, fluid passages as hereinbefore described, the alternating first and second plates 65, 72 are simply relatively rotated, staggered or adjusted to bring the exit holes 73, 74 of any one second plate 72 into communication, or longitudinal or vertical alignment, with the chambers 66, 69 of the first plate 65 overlying, and with the outlet passages 68, 71 of the first plate 65 underlying, that second plate 72, all as clearly shown by the intermediate or second, third and fourth plates in the FIG. 10 stack wherein the arrows show the fluid flow through one pair of inner and outer vortex chamber passages of this embodiment.

The five-plate set is completed, then, by the second plates 72 arranged at the top and bottom of the set to close, by their solid wall portions intermediate their said exit holes 73, 74, over the second plate 65 chamber openings 66, 69, and inlet passages 67, 70, and under the fourth plate 65 outlet passages 68, 71, intermediate before.

In the FIGS. 8-10 embodiment also the second plate 72 may additionally be formed with cutouts 75 in the same manner and to have the same function as heretofore described in reference to the first two-plate embodiment of FIGS. 1 and 5-7. The cutouts 75 may, of course, be provided in whatever wanted arrangement to uncover any or all of either or both the shorter and longer inlet sets 69, 70 of a succeeding first plate 65 as the valve plug passes from a preceeding first plate 65 to the intervening second plate 72.

The invention may further be embodied in a three-plate type trim, as shown in FIGS. 11-14 to comprise a first plate 76 having the vortex chamber openings 77 and chamber inlet cuts 78, a second plate 79 having the chamber exit holes 80, and a third plate 81 having the vortex passage exit cuts 82, all said vortex chamber openings 77, chamber inlets 78, chamber exit holes 80, and vortex passage exits 82 being uniformly and correspondingly, radially and circumferentially distributed about their respective first, second or third plates 76, 79, 81.

The completing of a single set or pattern of fluid passages in this three-plate embodiment is seen from FIG. 14 also to require a five-plate set, wherein the plates are successively, herein from top to bottom, third, first, second, third and first plates 81, 76, 79, 81, 76. In the FIG. 14 set, then, the fluid passages are formed as before within the intermediate or second, third and fourth plates 76, 79, 82 of the five-plate stack, with the top and bottom plates 81, 76 closing over the upper first plate 76 chamber openings 77 and inlets 78, and under the third plate 81 outlets 82, and with the unapertured portions of the intermediately positioned second plate 79 closing under the first plate 76 chamber openings 77 and over the third plate 81 outlets 82, as before.

The invention may be still further embodied in a precision cast plate design or form of trim, as shown in FIGS. 15-17 to comprise a single plate 83 wherein are cast the inlet passages 84, vortex chambers 85, exit holes 86, and exit passages 87. The plate 83 is cast, then, to provide a wanted number, in a uniformly circumferentially distributed array, of single stage, vortex chamber fluid passage forming openings therethrough.

The orienting or relative angular adjustment or rotative positioning of the plates 83 in any vortex chamber passage completing, three-plate set, is shown in FIG. 17 to require simply the lining up or bring to longitudinal coaxiality of all of the corresponding vortex chamber passage openings of the respective stacked plates 83. The proportioning or angular spacing of the vortex passage forming openings through the plates 83 is also such as to provide intervening solid or unapertured wall portions closing over the inlets 84 and chambers 85, and under the outlets 87; the bottom walls of the inlets 84 and chambers 85, and the top walls of the outlets 87, being closed by their being formed within the structure of the single cast plate 83 itself. The mentioned intervening of solid wall portions, in alternate plates of the stack, is herein accomplished, of course, by the angular offsetting, or vertical non-overlapping, of the inlets 84 and outlets 87, as made clear by their solid line-dash line showing in FIGS. 15 and 16, and by the vertical dash line indication of adjacent plate portion alignment in FIG. 17.

It will be apparent that in this FIGS. 15-17 embodiment all plates 83 are provided with fluid passages and inlets 84 similarly as with the alternative, one-plate type or embodiment of FIGS. 3 and 4, whereby the plate stack is free from the dead bands which are caused, as heretofore explained, by some stack plates having no fluid passage inlets.

Considering now together the several embodiments of the invention trim as herein shown and described, it will be understood that the plate openings or apertures, or vortex fluid passage portions, that are to communicate in the plate stack, are in all embodiments located at or to intersect the same or a common radial spacing, or intermediate circle. Similarly, while the fluid passage forming plate openings may be provided in varying multiplicity, and therefor at varying angular spacing, they also are uniformly angularly spaced, or circumferentially distributed, whereby, upon proper relative rotative positioning of the plates in the stack, the said plate openings forming communicating fluid passage portions may be brought into wanted alignment vertically of the plate stack.

It is herein also pointed out that the same net total number, area and volume of passageways may be given to one- and three-plate embodiments of the invention trim by providing the three-plate embodiment with three times as many inlets in its every third plate, as the one-plate embodiment has in its every plate.

It will be appreciated also that, for any one or another particular application of the invention control valve, valve trim, and trim plates, not only may there be selected an appropriate one of the several invention embodiments, but also, as to any embodiment, there may be varied or adjusted, to suit the particular application requirements, the height, bore, circumference and radial extent of the trim stack, and the circumferential and axial multiplicity, and dimensioning or general cross sectioning, of the vortex chamber fluid passages of the invention.

We claim:

1. A high pressure loss flow control valve comprising a valve housing having a fluid passage therethrough; a bridge partitioning said passage and having an opening therethrough;
a valve seat formed at said bridge opening;
a seat ring fitting said valve seat;
a gasket sealing between said valve seat and seat ring;
an access opening through the wall of said housing opposite said bridge opening;
a ring received in said housing wall opening;
a bonnet overlying said housing wall, said access opening and said received ring;
a gasket sealing between said bonnet housing wall and received ring;

a generally annular valve trim body spanning said fluid passage between said seated and received rings;

means for clamping said bonnet to said housing and thereby clamping up said rings, body and gaskets;

a valve plug having a sealing fit within said body; and means for shifting said plug between a valve-closed position of engagement against said seat and a valve-opened position of exposing said body to fluid flow through said bridge opening;

said valve trim body comprising
a stack of coaxially assembled plates together defining the generally annular inner and outer walls of said trim body,
said plates stack formed with a plurality of fluid passages extending between said inner and outer trim body walls, each said fluid passage comprising
a vortex chamber disposed intermediate said body walls;
a radial entrance passage opening from one said body wall tangentially into said vortex chamber;
an axial exit hole opening centrally from said vortex chamber; and
a radial exit passage intersecting said chamber exit hole and opening to the other said body wall.

2. A generally annular valve trim body for a high pressure loss flow control valve,
said trim body having
a plurality of fluid passages extending between its inner and outer walls,
each said fluid passage comprising
a vortex chamber disposed intermediate said body walls;
a radial entrance passage opening from one said body wall tangentially into said vortex chamber;
an axial exit hole opening centrally from said vortex chamber; and
a radial exit passage intersecting said chamber exit hole and opening to the other said body wall.

3. A one-plate type, low noise, vortex trim cage comprising a plurality of planar bodies coaxially assembled in a stack having generally annular inner and outer walls;
at least one set of four equal body sectors in each said body;
vortex chamber forming openings through the first of said body sectors,
said vortex chamber forming openings uniformly radially spaced intermediate said stack walls;
fluid passage entrance forming slots in said first body sectors and opening from one said stack wall tangentially into said vortex chamber forming openings;
vortex chamber exit forming holes through the second of said sectors;
said vortex chamber exit forming holes having the same radial spacing in said second body sectors as said vortex chamber forming openings have in said first body sectors;
fluid passage exit forming slots in the third of said body sectors, said slots opening to the other stack wall and extending radially from that wall in said third body sectors to the same radial spacing as said chamber exit forming holes have in said second body sectors;

said vortex chamber forming openings, fluid passage entrance forming slots, chamber exit forming holes, and fluid passage exit forming slots uniformly circumferentially distributed in said first, second, and third body sectors; and solid, unapertured body portions in the fourth of said body sectors;

said passage entrance forming slots, vortex chamber forming openings, vortex chamber exit forming holes, and passage exit forming slots combining to form vortex chamber fluid passages between said inner and outer walls by the relative rotative positioning of said planar bodies in said stack such that said solid, unapertured fourth sector body portions close over the tops of said passage entrance forming slots and vortex chamber forming openings and under the bottoms of said passage exit forming slots, such that said second sector chamber exit forming holes underlie the centers of said first sector vortex chamber forming openings, and such that said third sector passage exit forming slots underlie said second sector chamber exit forming holes.

4. A trim cage according to claim 3, wherein any one of said fluid passages is completed in any adjacent five of said bodies by their said relative rotative positioning to successively vertically align in said stack a fourth body sector, a first body sector, a second body sector, a third body sector, and a fourth body sector.

5. A plate for a one-plate type, low noise vortex trim cage, and for coaxial stacking to define radially and axially multiplied, single vortex chamber fluid passages extending between the inner and outer walls of said cage, said plate comprising
a planar body having generally annular inner and outer walls and divided into one or more sets of four equal body sectors;
vortex chamber forming openings through said body in the first sectors of said sets;
fluid passage entrance forming slots in said first body sectors, said slots opening from one of said inner and outer body walls tangentially into said vortex chamber forming openings;
vortex chamber exit forming holes through said body in the second sectors of said sets;
fluid passage exit forming slots in the third sectors of said sets, said slots opening to the other of said inner and outer body walls; and
solid planar body portions in the fourth sectors of said sets;
said vortex chamber forming openings and vortex chamber exit forming holes centered on, and said fluid passage exit forming slots extending radially from said other body wall to intersect, a common radius of said planar body, and
said vortex chamber forming openings, vortex chamber exit forming holes, and fluid passage exit forming slots uniformly correspondingly distributed circumferentially of their respective first, second and third sectors,
whereby in said stacking said single stage vortex chamber fluid passages may be completed in said cage by relative angular adjustment of said bodies to successively vertically align fourth, first, second, third, and fourth sectors of said sets.

6. A two-plate type, low noise, vortex trim cage, comprising a plurality of planar bodies defining first plates of said trim cage;

a plurality of planar bodies defining second plates of said trim cage;

said first and second plate bodies having mating radial faces and like dimensioned inner and outer walls;

each said first plate comprising a set of vortex chamber forming openings intermediate its said inner and outer walls and having fluid passage entrance forming portions inletting from one of said walls tangentially into said vortex chamber forming openings; and a set of fluid passage exit forming openings outletting to the other of said walls;

each said second plate comprising a set of vortex chamber outlet forming holes intermediate its said inner and outer walls, and a set of unapertured body portions angularly intermediate said outlet forming holes;

said first plate openings and said second plate holes having corresponding angular distribution circumferentially of said planar bodies, and said first plate chamber forming openings and said second plate outlet forming holes centered on, and said first plate exit forming openings extending radially from said other first plate walls to intersect, a common intermediate radius of said planar bodies;

said planar bodies coaxially stacked in said trim cage with said first and second plates alternating and relatively rotatively adjusted such that said second plate outlet holes communicate between said first plate vortex chamber and exit passage forming openings, and such that said unapertured portions of said second plates close over the tops and bottoms of said vortex chamber and exit passage forming openings in said first plates.

7. A first plate for a two-plate type, low noise vortex trim cage comprising a set of vortex chamber forming openings uniformly spaced around the plate and positioned on a common radius intermediate the plate bore and circumference, said vortex chamber forming openings having entrance portions inletting from said one of said bore and circumference tangentially into said vortex chamber forming openings; and a set of vortex passage exit forming openings uniformly spaced around the plate in alternation with said vortex chamber forming openings, said vortex passage exit forming openings outletting to the other of said bore and circumference and extending radially therefrom to intersect said common first plate radius.

8. A second plate for a two-plate type, low noise vortex trim cage comprising a set of vortex chamber exit forming holes uniformly spaced around the plate and on a common radius intermediate the plate bore and circumference, said vortex chamber exit forming holes positioned on the same radius of said second plate as on which are to be positioned the vortex chamber forming openings of a first plate for said two-plate low noise, vortex trim cage, said vortex chamber exit forming holes having also the same number and spacing around said second plate as said vortex chamber forming openings are to have on said first plate for said two-plate low noise, vortex trim cage; whereby a plurality of said second plates may be alternately stacked with a plurality of said first plates in said trim cage with said vortex chamber exit holes thereby communicating between said vortex chamber openings and said vortex passage exit openings, and with unapertured wall portions of said second plates angularly intermediate their said vortex chamber exit holes closing over the tops and bottoms of said vortex chamber openings and vortex passage exit openings in said first plates.

9. A two-plate type, low noise, vortex trim cage comprising a plurality of first plates formed with generally annular inner and outer walls, said first plates comprising inner vortex chamber forming openings uniformly spaced around said first plates, said inner vortex chamber forming openings positioned on common inner radii of said first plates;

shorter vortex chamber entrance forming openings inletting from one of said first plates walls tangentially into said inner vortex chamber forming openings;

longer vortex passage exit forming openings uniformly spaced around said first plates, said longer vortex passage exit forming openings outletting to the other of said first plates walls and extending radially therefrom to said common inner first plates radii;

outer vortex chamber forming openings uniformly spaced around said first plates, said outer vortex chamber forming openings positioned on common outer radii of said first plates;

longer vortex chamber forming openings inletting from said one of said first plates walls tangentially into said outer vortex chamber forming openings;

shorter vortex passage exit forming openings uniformly spaced around said first plates, said shorter vortex passage exit forming openings outletting to said other of said first plate walls and extending radially therefrom to said common outer first plates radii;

a plurality of second plates formed with generally annular inner and outer walls, said second plates comprising inner vortex chamber outlet holes uniformly spaced around said second plates, said inner vortex chamber outlet holes positioned on the same radii of said second plates as the radii of said first plates on which are positioned said inner vortex chamber forming openings of, and which are intersected by said longer vortex passage exit forming openings of, said first plates;

outer vortex chamber outlet holes uniformly spaced around said second plates, said outer vortex chamber outlet holes positioned on the same radii of said second plates as the radii of said first plates on which are positioned said outer vortex chamber forming openings of, and which are intersected by said shorter vortex passage exit forming openings of, said first plates;

said inner and outer vortex chamber forming openings having the same spacing on said first plates as have said longer and shorter vortex passage exit forming openings thereof; and said inner and outer vortex chamber outlet holes having the same spacing on said second plates as said inner and outer vortex chamber forming openings and said longer and shorter vortex passage exit forming openings have on said first plates;

said pluralities of first and second plates alternately stacked in said cage trim with said inner holes of said second plates communicating between said inner vortex chamber forming openings and longer vortex passage outlet forming openings of said first plates, with said outer holes of said second plates communicating between said outer vortex chamber forming openings and shorter vortex passage outlet forming openings of said first plates, and with unapertured portions of said second plates elsewhere closing over and under the openings in any successive two of said first plates to complete vortex chambers, vortex chamber entrances, and vortex passage exits in said two first plates;

any successive three of said second plates and alternating two of said first plates thereby completing vortex passages extending from said one to said other generally annular wall of said plates and having entrances in which the fluid flows radially, chambers in which the fluid flows spirally-radially, chamber outlets in which the fluid flows spirally-axially, and passage exits in which the fluid flows radially, of said trim.

10. A three-plate type, wall-to-wall passaged, vortex chambered trim cage comprising a plurality of first plates stacked in said trim cage;

vortex chamber forming openings uniformly spaced around and positioned on common radii of said first plates, said vortex chamber forming openings having entrance portions inletting from one cage wall tangentially into said vortex chamber forming openings;

a plurality of second plates stacked in said trim cage;

vortex chamber outlet holes uniformly spaced around said second plates and positioned on common radii thereof the same as said common first plates radii;

a plurality of generally annular third plates;

vortex passage exit forming openings uniformly spaced around said third plates, said vortex passage exit forming openings outletting to the other cage wall and extending radially therefrom to common third plate radii the same as said common first and second plate radii;

said vortex chamber forming openings, chamber outlet holes, and vortex passage exit forming openings being equally spaced around their said first, second and third plate pluralities;

first, second and third plates being successively stacked in said trim cage with said outlet holes in said second plates communicating between said vortex chamber forming openings in said first plates and said vortex passage exit forming openings in said third plates;

unapertured portions of said second plates elsewhere closing under said entrance portions and vortex chamber forming openings of said first plates and over said vortex passage exit forming openings of said third plates; and unapertured portions of said third plates closing over said entrance portions and vortex chamber forming openings of said first plates;

whereby any third, first, second, third and first plate succession of said plates completes said wall-to-wall, vortex chambered, fluid passages of said cage trim.

11. A first plate for a three-plate type vortex trim cage comprising a planar body having generally annular inner and outer walls;

a set of vortex chamber forming openings through said body, said openings uniformly spaced angularly and radially of said body; and a set of vortex chamber entrance forming openings through said body, said chamber entrance forming openings inletting from one of said inner and outer walls tangentially into said chamber forming openings.

12. A second plate for a three-plate type, vortex trim cage comprising a planar body having generally annular inner and outer walls; and a set of vortex chamber outlet holes uniformly spaced angularly and radially of said body, tha angular and radial spacing of said outlet holes on said planar body being the same as that of the vortex chamber forming openings of a first plate for said three-plate type vortex trim cage.

13. A third plate for a three-plate type vortex trim cage comprising a generally planar body having annular inner and outer walls; and a set of vortex passage exit forming openings uniformly spaced angularly and radially of said body, said vortex passage exit forming openings outletting to the other of said body walls and extending radially therefrom to the radial spacing of vortex chamber forming openings of a first plate for, and also the radial spacing of vortex chamber outlet holes of a second plate for, said three-plate type, vortex trim cage.

14. A one-plate type vortex trim cage comprising a plurality of duplicate plates having generally annular inner and outer walls;

a set of uniformly angularly distributed, wall-to-wall fluid passage forming openings in each said plate;

each said opening having an upper section formed by a vortex chamber forming recess and an entrance slot extending from one said wall tangentially into said recess;

each said opening having an intermediate section formed by a hole outletting from said vortex chamber recess; and each said opening having a lower section formed by an exit slot extending from the other said wall radially into said hole;

said plates stacked in said trim cage with their said passaged portions alternating, axially of said stack, with solid plate portions intermediate the said passaged portions whereby each said fluid passage is completed by the passaged portion of one plate and the overlying and underlying solid portions of two adjacent plates.

15. In a variable fluid restrictor comprising a housing having an inlet port and an outlet port for fluid flowing therethrough, an annular energy-absorbing device having a bore open to one of said ports and a circumference open to the other of said ports, a plug slidably axially in said bore, and an actuator connected to said plug to displace the same within the said bore to vary the surface of said bore exposed to said one port and thereby to vary the resistance to fluid imparted by said energy-absorbing device and to regulate the pressure loss therethrough; the improvement wherein said energy-absorbing device comprises
a stack of coaxially assembled plates;
a plurality of radially and axially distributed vortex chamber passages through said plates between said bore and circumference of said device, each said vortex chamber passage comprising
a generally circular, high resistance vortex chamber;
a passage entrance inletting from one of said device bore and circumference tangentially into said vortex chamber;
an exit hole at the approximate center of said vortex chamber; and
a passage exit outletting from said hole to the other of said device bore and circumference.

16. The fluid restrictor of claim 15, wherein the vortex passage entrances are provided in alternate plates of said stack and inlet from the bore of said device, and cutouts in the bore surfaces of stack plates intermediate said alternate stack plates,
said cutouts communicating with at least some of said passage entrances whereby when said plug is passing over one of said intermediate plates of said stack said at least some of said passage entrances are uncovered in the next one of said alternate plates of said stack.

17. The fluid restrictor of claim 15, wherein said vortex chamber exit passage has a larger cross section than said vortex chamber inlet passage.

18. The fluid restrictor of claim 15, wherein said vortex chamber exit passage has the same cross section as said vortex chamber inlet passage.

19. The fluid restrictor of claim 15, wherein each said vortex chamber is formed by an opening through one of said stack plates,
and wherein said opening is closed axially of said stack by portions of the surfaces of the adjacent two of said stack plates.

20. The fluid restrictor of claim 15, wherein said passage entrances and exits comprise radial slots, and wherein said exit holes comprise axial holes, in said plates.

21. The fluid restrictor of claim 15, wherein said exit holes are formed in alternate ones, and said vortex chambers and entrance and exit passages are formed in every other one, of said plates.

22. The fluid restrictor of claim 15, wherein said vortex chambers and entrance passages are formed in a first set, said exit holes are formed in a second set, and said exit passages are formed in a third set, of said plates, and said first, second and third sets of plate members are repeating sequentially through said stack.

23. The fluid restrictor of claim 15, wherein said vortex chamber passages comprise
a set of inner vortex chambers and relatively short passage entrances and relatively long passage exits alternating with
a set of outer vortex chambers and relatively long passage entrances and relatively short passage exits.

24. The fluid restrictor of claim 15, wherein said entrances, chambers, holes and exits of said vortex chamber passages are all formed in each of said plates.

25. The fluid restrictor of claim 15, wherein said vortex chambers comprise relatively large round holes in at least some of said plate members.

26. The fluid restrictor of claim 23, wherein said chamber exit holes comprise a set of inner exit holes communicating between said inner vortex chambers and said relatively long exits and a set of outer exit holes communicating between said outer vortex chambers and said relatively short passage exits.

27. The fluid restrictor of claim 25, wherein said vortex passage entrances comprise radial, parallel-straight-sided cuts in said some of said plates, said radial cuts tangential to one side of, and less than half the width of, said relatively large round holes.

28. The fluid restrictor of claim 25, wherein said exit holes comprise relatively small round holes in at least some of said plates, said relatively small round holes coaxial and communicating with said relatively large round holes.

29. The fluid restrictor of claim 27, wherein said passage exits comprise
radial, parallel-straight-sided cuts in said at least some of said plate members, said radial cuts opening into said exit holes.

30. A high pressure loss flow control valve comprising
a valve housing having a fluid passage therethrough;
a bridge partitioning said passage and having an opening therethrough;
a valve seat formed at said bridge opening;
an access opening through the wall of said housing opposite said bridge opening;
a bonnet overlying said access opening;
a generally annular valve trim body spanning said fluid passage between said valve seat and bonnet;
means for clamping said bonnet to said housing and thereby engaging said bonnet to said trim body and said trim body to said seat;
a valve plug having a sealing fit within said trim body; and
means for shifting said plug between a valve-closed position of engagement against said seat and a valve-opened position of exposing said body to fluid flow through said bridge opening;
said valve trim body comprising
a stack of coaxially assembled plates together defining the generally annular inner and outer walls of said trim body,
said plates stack formed with a plurality of fluid passages extending between said inner and outer trim body walls, each said fluid passage comprising
a vortex chamber disposed intermediate said body walls;
a radial entrance passage opening from one said body wall tangentially into said vortex chamber;
an axial exit hole opening centrally from said vortex chamber; and
a radial exit passage intersecting said chamber exit hole and opening to the other said body wall.

* * * * *